(No Model.)
R. P. JONES.
ICE CREAM FREEZER.
No. 530,779. Patented Dec. 11, 1894.
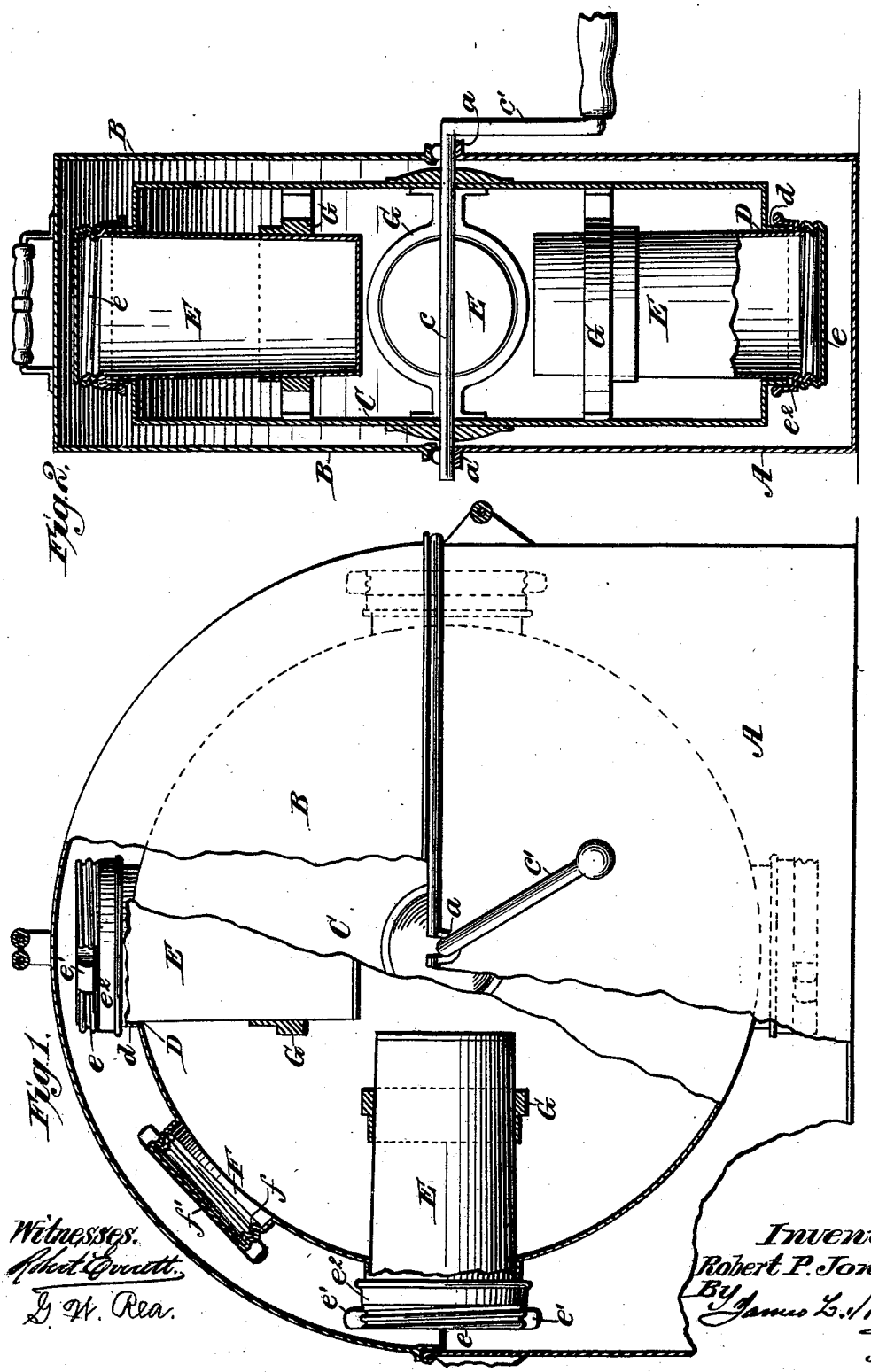
Witnesses.
Inventor.
Robert P. Jones,
By James L. Norris
Atty.

UNITED STATES PATENT OFFICE.

ROBERT P. JONES, OF ROCHEPORT, MISSOURI.

ICE-CREAM FREEZER.

SPECIFICATION forming part of Letters Patent No. 530,779, dated December 11, 1894.

Application filed June 30, 1894. Serial No. 516,228. (No model.)

*To all whom it may concern:*

Be it known that I, ROBERT PAINE JONES, a citizen of the United States, residing at Rocheport, in the county of Boone and State of Missouri, have invented new and useful Improvements in Ice-Cream Freezers, of which the following is a specification.

My invention relates to improvements in ice cream freezers, and especially to that class wherein the substance to be frozen or congealed is contained within cups or cans fitted within a revolving drum or vessel adapted to contain the refrigerant; and it has for its object to improve and simplify the construction of such devices and to render them more efficient, durable and economical.

To these ends my invention consists in the novel construction, arrangement and combination of parts hereinafter fully described and afterward definitely pointed out in the claim following the description, due reference being had to the accompanying drawings, forming a part of this specification, wherein—

Figure 1 is a side elevation partly broken away; and Fig. 2 a transverse, vertical, central section thereof.

Referring to the drawings, the letter A indicates a casing shown as comprising in the present instance a rectangular sheet metal casing provided with a removable semi-circular cover B, but the shape of the casing and cover and the materials of which they are formed are immaterial, the purpose of the casing being merely to form a support for the revolving drum and to form an insulation for the freezing apparatus. Arranged to revolve in the casing A is a drum C, comprising a sheet metal cylinder provided with a transverse shaft $c$ resting in semi-circular bearings $a$ formed in the upper edges of the side walls of the casing A, said shaft at one end being provided with a crank or handle $c'$ by means of which the drum may be rotated. The drum C is provided upon its periphery at equi-distances apart with circular apertures D, from the edges of which project annular flanges $d$, said apertures being designed for the reception of the cans E for containing the substance to be congealed or frozen. Said cans each consist of a slightly tapering vessel screw-threaded at its upper edge for the reception of a correspondingly screw-threaded cover $e$, which latter is preferably provided with handles $e'$ to facilitate screwing on and off said cover. Each of the cans E, at a point slightly below the top thereof, is provided with a downwardly depending flange or collar $e^2$, for the purpose hereinafter made apparent, said flange being preferably made to flare slightly outward. The cans E are placed in the drum C through the apertures D, and being tapering they are tightly embraced by the flanges $d$ as they are forced in, the depending collars $e^2$ on the can fitting over the flanges $d$, causing the latter to still more tightly embrace the cans and causing the latter to fit perfectly air and water tight in the drum. The periphery of the drum C is also provided with a filling orifice F which is surrounded by a screw-threaded flange $f$ over which is adapted to be secured a lid or cover $f'$, said orifice serving for the introduction into the drum of ice and salt. As the drum C is rotated the impact of the ice against the cans E is apt to loosen the latter in their seats within the periphery of the drum, and in order to prevent this I support the inner ends of the cans by means of a series of annular seats or collars G, one for each can, which are arranged within the drum opposite the apertures D and secured to the sides of said drum in any suitable manner. When the cans E are inserted in the apertures D the lower or inner ends of said cans seat themselves in the collars G and firmly support the cans against lateral displacement which would otherwise result from the impact of the ice as the drum is rotated.

It will be observed that in my improved construction, the inner surfaces of the flanges $d$ are perfectly smooth, and the cans E are retained in position solely by frictional contact between the flanges $d$, collars $e^2$, and collars G. By this means the employment of screw-threaded connections and other extraneous securing devices is avoided, and the apparatus is more economically constructed.

The operation of the device will be readily understood. The cans having been filled with the substance to be frozen or congealed and the covers having been screwed thereon, they are placed in the drum by simply forcing them in the apertures D, there being no fastenings or locking devices of any kind whatever to manipulate. The drum is then filled with ice and salt and rotated by means of the handle $c'$. As the drum is rotated the ice is caused to come into intimate contact with every portion of the cans and the contents of the cans kept in constant agitation, causing an equal and uniform freezing of the cream.

Having described my invention, what I claim is—

An ice-cream freezer, consisting of a rotary drum having its periphery provided with a series of apertures, the edge of each of which is constructed with an annular flange $d$, the radially arranged cans E fitting said apertures and each provided with an annular outwardly flaring collar $e^2$ engaging and tightly embracing one of the said flanges, and a series of collars G fixed to the drum and receiving the inner ends of the cans, all of the cans being retained in position solely by frictional contact with the said flanges and collars, substantially as and for the purposes described.

In testimony whereof I have hereunto set my hand and affixed my seal in presence of two subscribing witnesses.

ROBERT P. JONES. [L. S.]

Witnesses:
W. H. DENHAM,
J. P. MEAD.